July 12, 1927.

W. E. WOODARD

LOCOMOTIVE ASH PAN

Filed Feb. 20, 1925

INVENTOR
William E. Woodard
BY
Synnestvedt & Lechner
ATTORNEYS

Patented July 12, 1927.

1,635,239

UNITED STATES PATENT OFFICE.

WILLIAM E. WOODARD, OF FOREST HILLS, NEW YORK.

LOCOMOTIVE ASH PAN.

Application filed February 20, 1925. Serial No. 10,499.

This improvement has reference to locomotive ash pans and is particularly applicable to locomotives having the type of articulated trailer truck frame which is shown in my Patent No. 1,536,036 granted April 28, 1925, but is capable of use with other types of locomotive truck constructions.

The first of the objects of this invention is to support the ash pan directly upon the truck frame instead of from the boiler structure or locomotive frame and to provide such a form of the sloping sides of the pan that the same will always be in position to receive the discharge of ashes from the underside of the grate no matter what may be the position of the truck relative to the fire box of the locomotive.

In carrying out my invention I provide the bottom portion of the pan with discharge hoppers and closure doors for the hoppers the general construction of which is substantially along usual lines but I am able to form the hoppers much wider and the hopper doors also much wider than are customarily used in the ordinary locomotive ash pan structure. The use of a pan attached to the truck structure whose pulling members are outside the plane of the wheels permits the use of the wider hoppers. This is because there is no pulling member or other frame structure between the truck wheels, and the entire space is therefore available for the ash pan structure.

In order that my invention may be better understood I will proceed to describe it in connection with the accompanying drawings in which I have illustrated it in preferred form and in which Fig. 1 is a side view partly in section showing my improved ash pan structure applied in position under the grate opening of the fire box.

Figure 1:
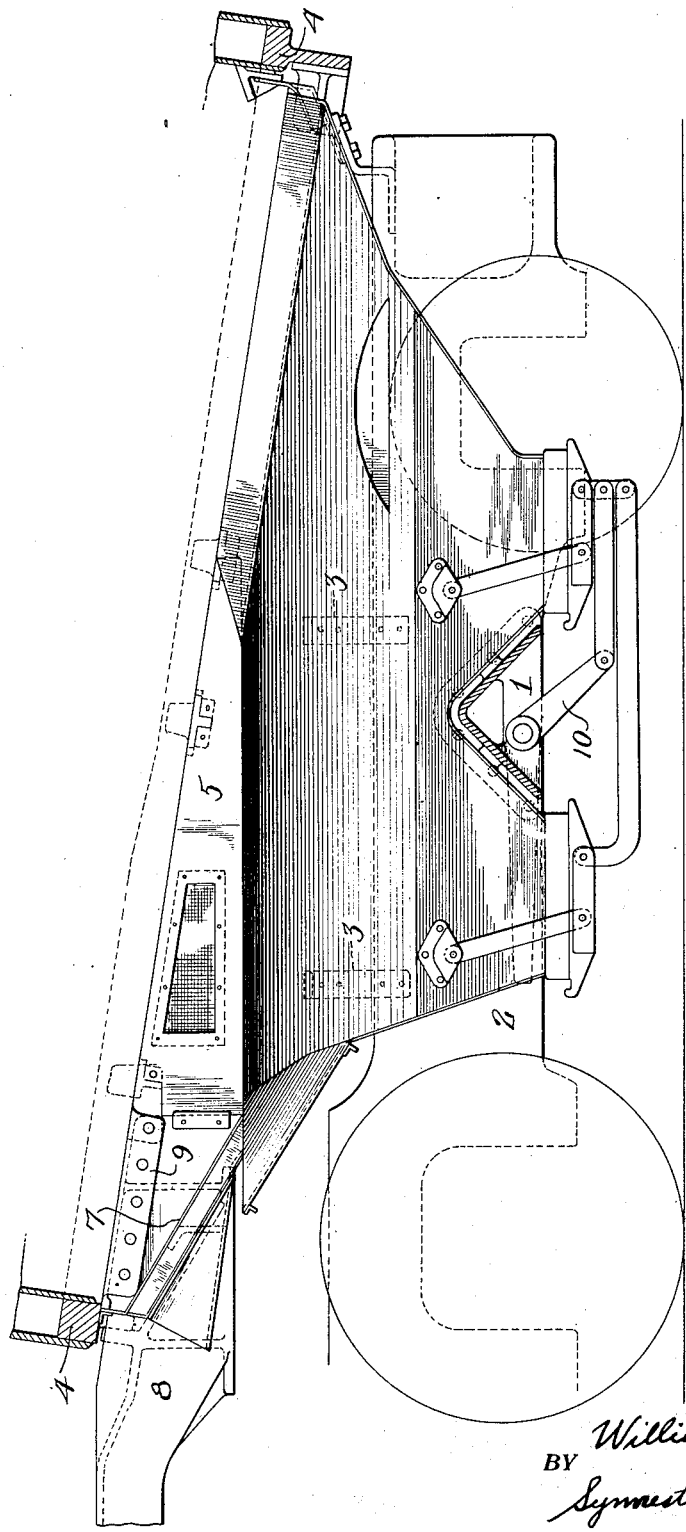
Figure 2:
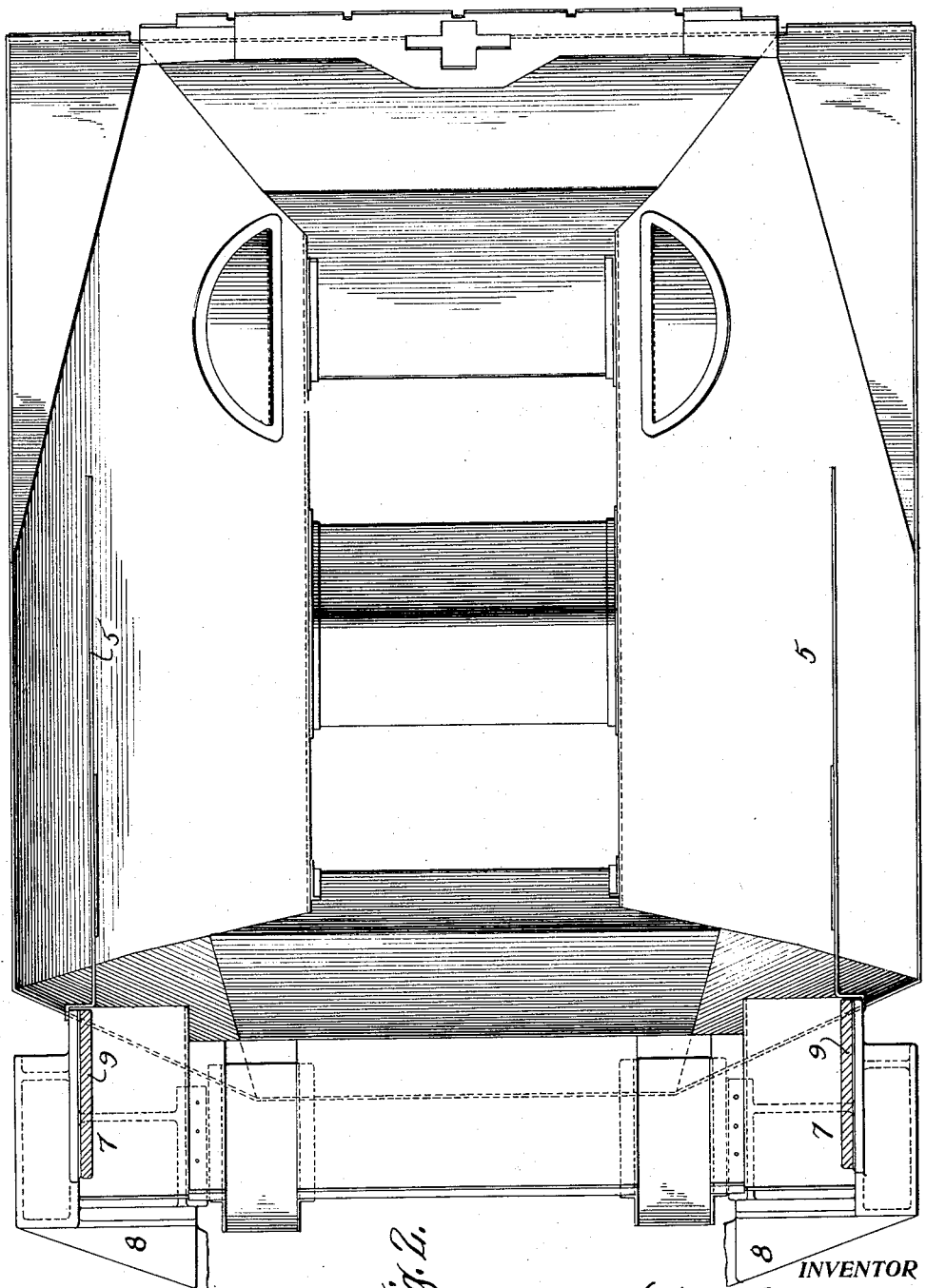
Fig. 2 is a plan view of the same.
Figure 3:
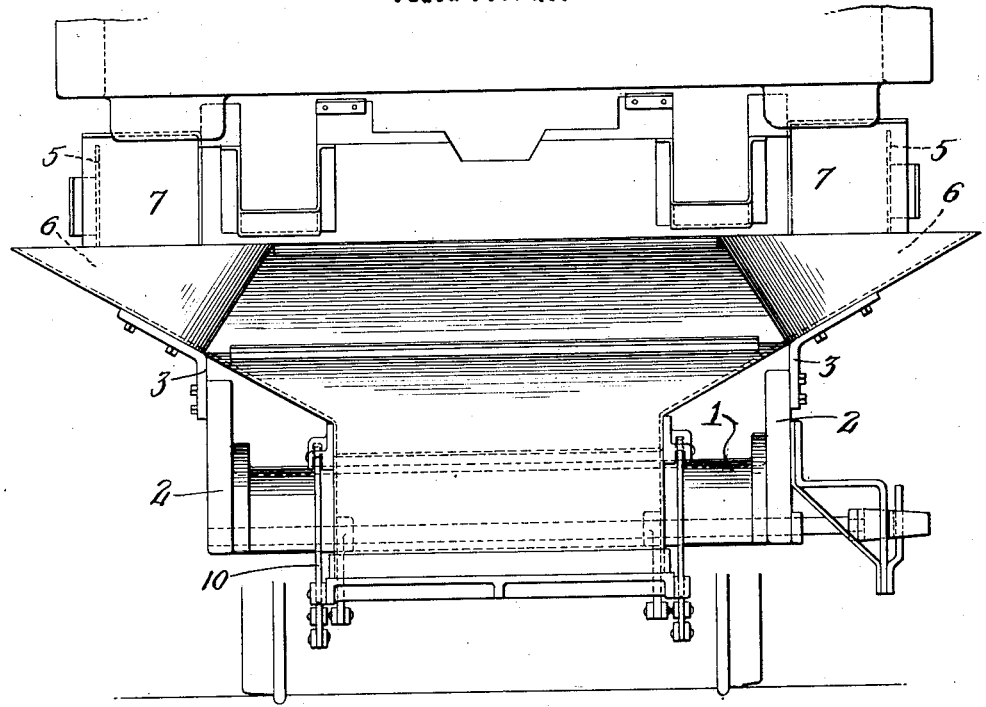
Fig. 3 is an end view showing the relative position between the ash pan structure and a pair of truck wheels the lower portions of which only are shown.
Figure 4:
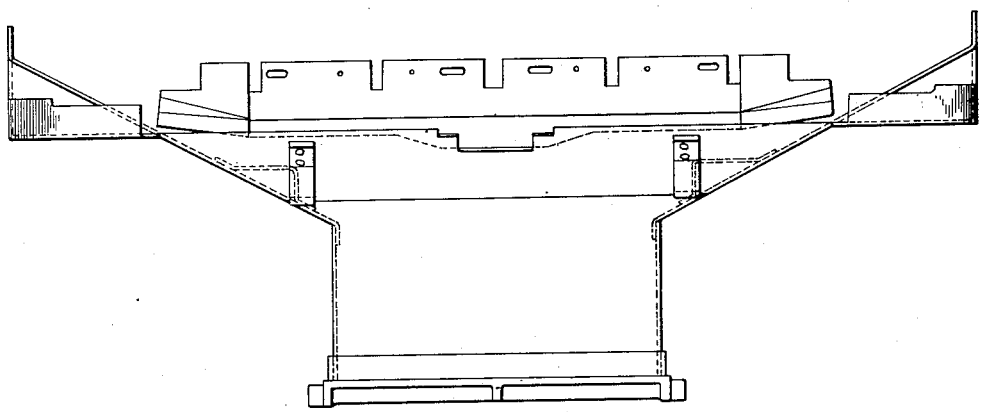
Fig. 4 is a detailed view of the mechanism apart from some of the cooperating structure.

Referring now more particularly to Fig. 1 it will be seen that therein, indicated in outline, are two pairs of wheels of a four-wheeled trailer truck with the truck frame shown in its relation to the lower portion of the fire box construction and locomotive frame.

As a primary means of support for the pan I provide a steel casting or a similar structure 1 which is bolted or otherwise securely fastened between the side members 2 of the truck frame. As additional support for the upper part of the pan I provide brackets 3 which are fastened directly to the members of the truck.

In a particular construction which I have shown it will be noted that a portion of the top of the pan lies below the plane of the bottom of the boiler mud ring 4. In order to prevent ashes and sparks from flying out of this space, this opening is closed by a vertical deflector plate 5 extending downward from the lower side of the mud ring. It will be noted that these deflector plates extend down only to the plane of the top of the ash pan which leaves a clear opening 6 for the entrance of air to the pan and for observation purposes.

Towards the front of the pan I use no deflectors but turn the outside edges of the pan upward to the line of the mud ring thus preventing the escape of sparks and ashes at this point. I form this upward flange at the outer side of the pan well beyond the outside edge of the boiler so as to leave a clear air space between the flange and the boiler and to allow free motion of the truck relative to the fire box.

At the rear of the fire box I also provide deflecting plates 7 which latter move with the fire box and carry ashes down to the point where they will be dropped into the ash pan.

In locomotives employing this type of articulated trailer truck the cab and cab parts are supported by a casting 8 bolted to the back end of the mud ring 4. In carrying out my present improvement I have utilized this casting 8 not only as a cab support but also to form a continuation of the vertical deflector plate mentioned above and also to form a deflecting surface under the back of the fire box to deflect the ashes into the pan at that point. This casting is formed with flanges or lugs 9 as a support for the deflecting plate or, if preferred, I can make the deflecting plate a portion of the casting itself.

The ash pan dump rigging 10 is attached directly to the frame of the truck and therefore has no motion relative to the ash pan itself.

Amongst other advantages possessed by my improvement may be mentioned the fact that the ash pan moving as it does with the truck frame does not require the provision of lateral clearance between the hoppers and the wheels and truck parts as is the case with the ordinary construction in which the pan is bolted to the boiler and in which arrangement the bottom of the ash pan must be constructed so that it will clear the moving parts when they pass around a curve. This ordinary arrangement of course necessitates that the bottom of the pan must be very narrow whereas in my construction the bottom of the pan and the hoppers as well can be made very wide. It may be mentioned that whereas in the ordinary arrangement hoppers about 20 inches wide are about as great as can be obtained, in my construction, I am actually making them as wide as 40½ inches.

This makes it possible in carrying out my invention to secure a pan of very large capacity which is a considerable advantage particularly in locomotives making long runs between division points as it is evident that under such conditions large capacity is required to allow sufficient accumulation of ashes.

A further advantage of my improvement is that because the pan is bolted directly to the truck frame I obtain a very secure and stable support for the same and it is not subjected to the various strains which result when the pan has to be supported as in the ordinary structure from the bottom of the mud ring.

Still another advantage of my improvement is that because of the relation of the sides of the pan to the bottom of the mud ring and deflector I secure very large spaces for the admission of air under the grate obtaining thereby better combustion of fuel.

Still another advantage which I obtain by my present invention is that in a structure of the character described it is possible to assemble the ash pan at the point where the truck is being built in which case, of course, the construction of the pan is greatly facilitated because it is more readily accessible both from the top and bottom and sides and can be completely assembled before it is applied to the locomotive.

This is not the case in pans of ordinary construction with which I am familiar which have to be assembled under the locomotive piece by piece. In the ordinary form of construction the pan has to be bolted to the mud ring and the various portions must be fitted in so as to clear the ends of the frame, wheels, etc., and this requires considerable labor and labor applied at a substantial disadvantage.

It is also evident that if desired the entire pan in my construction which is supported on the truck structure can be cast in one piece or in a number of cast pieces and the whole mechanism bolted into the trailer frame structure. A still further advantage of my improvement is that certain portions of the side and cross truck members themselves can be made to serve as portions of the ash pan and form a part thereof which of course economizes both in material and weight.

I claim:

1. A locomotive ash pan structure carried by a truck beneath the fire box in position to receive the discharge of ashes from the fire box in all positions of the truck.

2. A locomotive ash pan structure comprising in combination a trailer truck, castings secured to said trailer truck and directly supporting the ash pan structure.

3. A locomotive ash pan structure comprising in combination a truck, an ash pan carried on said truck and deflecting plates secured near the bottom of the fire box to direct the ashes into the pan in various positions of the truck.

4. A locomotive ash pan structure comprising in combination a truck, an ash pan carried on said truck and deflecting plates secured near the bottom of the fire box to direct the ashes into the pan in various positions of the truck, said deflector forming a partial closure for the open space between the ash pan and the bottom of the boiler mud ring.

5. An ash pan structure comprising in combination a truck, an ash pan proper carried on said truck, castings secured to the mud ring and arranged to support the cab and also form a deflector to direct the ashes into the ash pan on the truck.

6. An ash pan structure comprising in combination a truck, an ash pan proper carried on said truck, castings secured to the mud ring and arranged to support the cab and also form a deflector to direct the ashes into the ash pan on the truck and also vertical closure for the space between the bottom of the mud ring and the top of the ash pan.

7. In a locomotive having a grate the combination of a truck movable under the grate and an ash pan carried by the truck adapted to receive the ashes from the grate in any position of the truck.

8. A locomotive ash pan structure comprising in combination a truck frame, an ash pan carried thereby and having a discharge outlet, a closure therefor, and operating mechanism for said closure carried by the truck frame.

9. A locomotive ash pan structure comprising in combination a truck frame articulated to the main frame of the locomotive, the pulling members of the truck frame being outside the plane of the wheels, and supports for the ash pan carried by said pulling member.

10. In combination a locomotive ash pan structure comprising an articulated truck structure having its pulling members outside the plane of the truck wheels, a pair of truck wheels and an ash pan structure carried upon the truck members, its lower portion occupying substantially the entire transverse space between the truck wheels.

In testimony whereof, I have hereunto signed my name.

WILLIAM E. WOODARD.